(12) United States Patent
Elder

(10) Patent No.: US 8,351,578 B2
(45) Date of Patent: Jan. 8, 2013

(54) SYSTEM FOR INSTALLATION TESTING OF TELEPHONE LINE TERMINATIONS

(75) Inventor: Joseph Marcus Elder, Boulder, CO (US)

(73) Assignee: Genband US LLC, Frisco, TX (US)

( * ) Notice: Subject to any disclaimer, the term of this patent is extended or adjusted under 35 U.S.C. 154(b) by 648 days.

(21) Appl. No.: 12/552,655

(22) Filed: Sep. 2, 2009

(65) Prior Publication Data

US 2010/0054425 A1    Mar. 4, 2010

Related U.S. Application Data

(60) Provisional application No. 61/093,874, filed on Sep. 3, 2008.

(51) Int. Cl.
*H04M 1/24* (2006.01)
*H04M 3/08* (2006.01)
*H04M 3/22* (2006.01)
(52) U.S. Cl. ........................ 379/15.03; 379/18
(58) Field of Classification Search .............. 379/1.01, 379/15.03, 18, 24, 29.04, 29.08, 219
See application file for complete search history.

(56) References Cited

U.S. PATENT DOCUMENTS

| 3,752,940 | A | | 8/1973 | Santulli et al. |
| 4,224,477 | A | | 9/1980 | Perkinson et al. |
| 4,334,129 | A | | 6/1982 | De Luca et al. |
| 4,454,388 | A | | 6/1984 | Daniels et al. |
| 4,653,043 | A | * | 3/1987 | Brady et al. .................. 370/250 |
| 5,187,733 | A | * | 2/1993 | Beffel et al. ................. 379/9.06 |
| 5,274,692 | A | * | 12/1993 | Lechner et al. ............ 379/29.08 |
| 5,832,058 | A | | 11/1998 | Walance et al. |
| 6,763,108 | B1 | * | 7/2004 | Stephens ................. 379/399.01 |

* cited by examiner

*Primary Examiner* — Quoc D Tran
(74) *Attorney, Agent, or Firm* — Haynes and Boone, LLP

(57) ABSTRACT

A wiring verification system is disclosed for testing the correct pairing of a plurality of subscriber lines between an existing line termination system and a replacement line termination system to assist in the transfer of the subscriber line terminations from the existing line termination system to the replacement system. The wiring verification system comprising a controller and two testheads, one of which places test calls from the line under test to a designated test line that is terminated by the second testhead. The electrical qualities of the wye splices between lines associated with new line termination system and those of the existing line termination system are analyzed for correctness and possible hazardous conditions. The directory number of the line under test can be verified by decoding the calling line ID. Automated test strategies provide details related to which splices require attention and suggestions for remediation.

17 Claims, 10 Drawing Sheets

FIG. 9

| ERR | DESCRIPTION | PROBABLE CAUSE | ACTION | WIRING ERROR |
|---|---|---|---|---|
| NC | NO CONNECT | NEW LTS NOT READY | RETRY | INDET. |
| PR | POWER RINGING | SUB. BEING CALLED | RETRY | INDET. |
| PE | POLARITY ERROR | REVERSED T&R | CHK WIRING | YES |
| OH | OFF HOOK | SUB. OFF HOOK | RETRY | INDET. |
| HV | HIGH VOLTAGE | WIRING CROSSED | CHK WIRING *CAUTION* | YES |
| LC | LOW CURRENT | OPEN OR SHORTED WIRE | CHK WIRING | YES |
| HC | HIGH CURRENT | WIRING CROSSED | CHK WIRING *CAUTION* | YES |
| DT | NO DIAL TONE | SUB. NOT PROVISIONED | CHK PROVISIONING | INDET. |
| RB | RINGING BAD | TL DN ERROR | CHK PROVISIONING | INDET. |
| DN | DIRECTORY NUMBER | WIRING OR PROV. ERROR | CHK WIRING | YES |
| LS | LOOP SWITCH | BAD TEST HEAD | CHK TEST HEAD | NO |
| TA | TONE A | BAD TEST HEAD | CHK TEST HEAD | NO |
| TB | TONE B | BAD TEST HEAD | CHK TEST HEAD | NO |

FIG. 10

| LUT | ASSUMED DN | RECEIVED DN | ERR CODE | WIRE ERROR |
|---|---|---|---|---|
| 1 | 303-555-1212 | 303-555-1212 | | |
| 2 | 303-555-4600 | 303-555-4600 | | |
| 3 | 303-555-1214 | | PE | YES |
| 4 | 303-555-2412 | 303-555-2412 | | |
| 5 | 303-555-6618 | 303-555-6618 | | |
| 6 | 303-555-2345 | 303-555-2445 | DN | YES |
| 7 | 303-555-1234 | | LC | YES |
| 8 | 718-226-7423 | 718-226-7423 | | |
| 9 | 303-555-1255 | 303-555-1255 | | |
| 10 | 303-555-1212 | 303-555-1212 | | |
| 11 | 303-555-1212 | 303-555-1212 | | |

SYSTEM FOR INSTALLATION TESTING OF TELEPHONE LINE TERMINATIONS

RELATED APPLICATION

The present application is based on and claims priority to the Applicant's U.S. Provisional Patent Application 61/093,874, entitled "System For Installation Testing Of Telephone Line Terminations," filed on Sep. 3, 2008.

BACKGROUND OF THE INVENTION

1. Field of the Invention

The present invention relates generally to the field of telephony. More specifically, the present invention discloses a test system that enables the automated testing of line termination systems when they are replaced with newer or more capable technology.

2. Statement of the Problem

In the applications considered herein, line termination systems interface on the network side with the traditional copper twisted pair telephone line which provides telephone service to subscribers at the other terminus. These line termination systems may take the form of conventional central office line frames associated with the local switching system or may be "access systems" which reside in a remote location such as a field cabinet. In any case, when an existing line termination system that is providing service to subscribers is to be replaced with a different line termination system, it is imperative that the designation of subscriber pairs on the new system and those of the existing system be consistent for the conversion from the first system to the second to be seamless. For example, a subscriber pair that is known to the existing line termination system as a given Directory Number (DN) must be physically associated with a pair in the replacement line termination system that corresponds to that same DN for service to be uninterrupted upon transfer to the replacement system. In the prior art, insuring the proper association of the new and existing line termination system pairs either relies on proprietary functionality within the replacement switching system or entails laborious manual testing and verification. The instant invention discloses a method and system for testing the accuracy of installation of replacement line termination systems independently of equipment vendors and technology in a manual or fully automated manner.

Wireline telephone service providers use line termination systems to interconnect between a subscriber's conventional telephone station equipment and the greater telephone network generally through a local switching system. Commonly these line termination systems take the form of proprietary line frames which are integrated into, and a part of, the local switching system. When technological advances, obsolescence, or other factors necessitate the conversion from the existing line termination system to another one, the correct association of subscriber pairs between the two systems presents an installation challenge. The conversions from older electromechanical switching systems to newer electronic switching systems that took place generally between the years 1980 and 2000 in North America exemplify this problem. It was customary to connect the subscriber pairs terminating on the older switching system simultaneously to those of the replacement system's subscriber pairs. The line termination systems on the replacement systems were designed so as not to interfere with the installed system's operation nor provide service to these subscribers until such time as testing is complete and all subscribers can be simultaneously transferred to the new system, a procedure known as a "flash cutover".

These conversions of local switching systems frequently involve many thousands of subscriber pairs and to facilitate the test process automation is highly desirable. Modern switch vendors have incorporated this functionality in their proprietary line termination systems (line frames) in association with the proprietary control and test facilities which constitute the switching system. For example, in the commonly deployed Alcatel-Lucent 5ESS®, this capability is referred to as "Office To Office" (OTO) testing. When a 5ESS is installed to replace an existing switch, OTO testing employs the internal "test trunk" assets of the existing switch and that of the replacement 5ESS to verify that the physical subscriber pairs that the existing switch associates with a given directory number are identical to that of the replacement switch.

As the currently deployed central office technology is now itself becoming obsolete, telephone companies are replacing traditional local switching systems with general purpose line termination systems, such as access systems, which do not have these internal testing capabilities and do not accommodate these proprietary installation verification methodologies. Herein lies a problem in the art.

SUMMARY OF THE INVENTION

This problem is solved and a technical advance is achieved in the art by a system and method that utilizes the standards-based interfaces on general purpose line termination systems to provide the same or similar installation verification testing prior to cutover to these replacement line termination systems.

BRIEF DESCRIPTION OF THE DRAWINGS

A more complete understanding of this invention may be obtained from a consideration of this specification taken in conjunction with the drawings, in which:

FIG. 9 is a table illustrating exemplary error conditions that could be detected along with probable causes and suggested corrective actions associated with the testing of a single subscriber line; and FIG. 10 is a table illustrating exemplary results of automation of the testing of a plurality of subscriber lines employing the present invention.

DETAILED DESCRIPTION OF THE INVENTION

Figure 1:
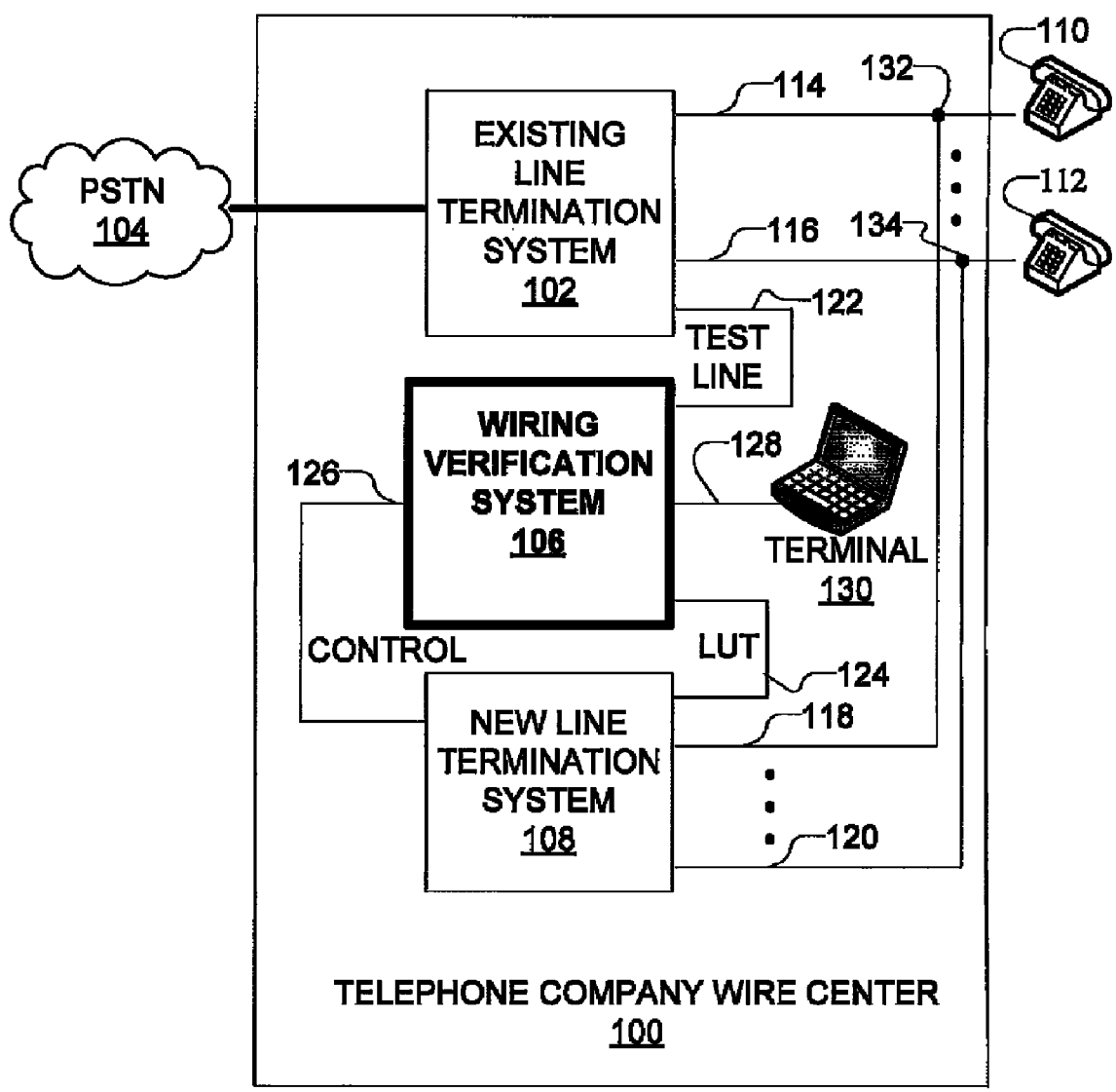
FIG. 1 is a block diagram of a telephone company wire center in which an exemplary embodiment of this invention is implemented.

FIG. 1 is a block diagram of a telephone company wire center 100 in which an exemplary embodiment of this invention operates. The wire center 100 connects the twisted pair telephone conductors which provide service to the telephone subscriber's station equipment such as telephones, facsimile machines, and modems to the greater telephone network by means of a line termination system 102. A plurality of individual telephone subscribers served by line termination system 102 are depicted as 110, 112. Typically the line termination system will interconnect with the Public Switched Telephone Network 104 by means of a local switching system which is omitted in this illustration for simplicity. This configuration is used herein for convenience and clarity in describing the invention; it is well known in the art that the wire center 100 is part of the PSTN 104. The wire center 100 will commonly be a telephone central office but may also be in the form of a field cabinet, equipment vault, or other location subsidiary to a central office. The existing line termination system may be integrated into the switch and be referred to as a line frame; or a remote system such as a Digital Loop Carrier (DLC), Subscriber Loop Carrier (SLC), Multi-Service Access Platform (MSAP), which are generically referred to as "access systems". For the purposes of this specification, all such systems, whether they be located in the central office or remotely, are referred to as Line Termination Systems (LTS).

In accordance with one aspect of this invention, a Wiring Verification System (WVS) 106, shown in heavy block in FIG. 1, can be employed to verify that a replacement line termination system, herein the New Line Termination System 108, has been correctly installed to replace an Existing Line Termination System 102. The interconnections of the existing LTS 102 and the new LTS 108 on the subscriber line side are by means of "wye splices" 132, 134 interconnecting the subscriber pairs illustrated in FIG. 1 as 114 and 116 which provide telephone service to subscribers 110 and 112 respectively with the intended replacement subscriber pairs 118, 120. While subscriber pairs 114, 116 are illustrated as a single line in FIG. 1, one conversant in the art will appreciate that they actually consist of a pair of conductors referred to as "tip" and "ring", in North America (A and B leads elsewhere), and that the wye splice must connect tip to tip and ring to ring for reliable operation. For the testing phase of new LTS 108 to proceed without interference to service provided to subscribers 110, 112 telephone port circuits terminating pairs 118, 120 on new LTS 108 must be capable of presenting a high impedance to the subscriber pair 114, 116 unless testing is occurring or cutover to the new LTS 108 has taken place.

To facilitate the testing of the wiring, WVS 106 uses a test line 122 to place and receive telephone calls into the PSTN 104. For convenience and clarity, test line 122 is shown to terminate on the existing LTS 102, whereas one skilled in the art will appreciate from studying this specification that this connectivity to the PSTN 104 could be accomplished in many ways including but not limited to: another switching system, a cellular network, or a Voice over the Internet Protocol (VoIP) network. In conjunction with test line 122, WVS 106 uses Line Under Test (LUT) port 124 by which means new LTS 108 connects to specific ports 118, 120 responsive to WVS 106 communicating by means of control interface 126. In accordance with another aspect of this invention and by means of the connectivity and control functionality just described, WVS 106 may place a call through a specific port, for example subscriber pair 114, on existing LTS 102 by means of LUT 124 and through replacement subscriber line 118 and wye splice 132 to the directory number associated with test line 122 whereupon caller ID decoding means within WVS 106 may learn the directory number associated with subscriber pair 114. Additional verification testing methodologies within this exemplary embodiment are disclosed in this specification.

Figure 2:
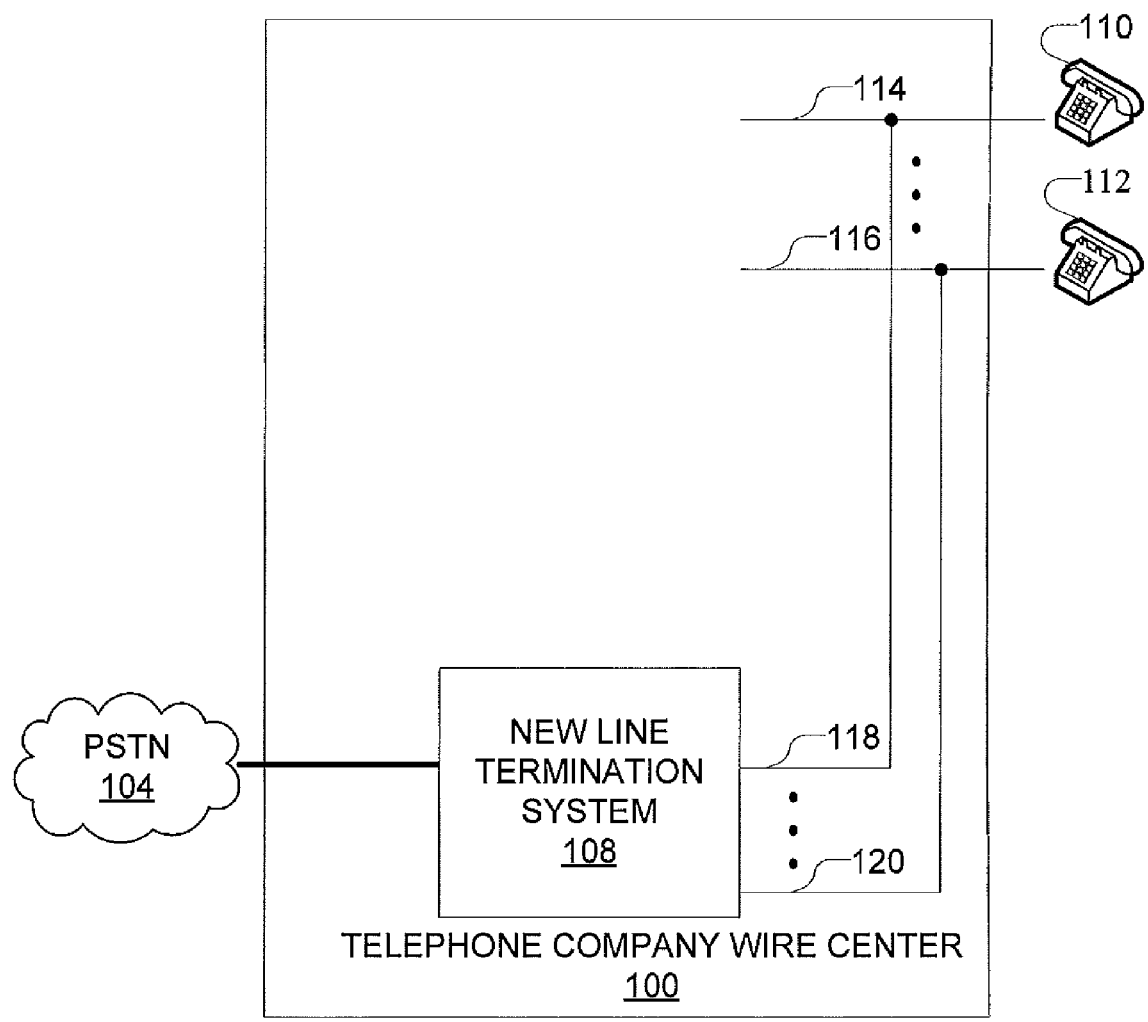
FIG. 2 is a block diagram depicting the telephone company wire center of FIG. 1 after transition to the new line termination system.

FIG. 2 illustrates the goal of the conversion to the new LTS 108. After successful testing of the wiring configuration and cutover from the existing LTS 102; telephone traffic related to the plurality of subscribers 110, 112 and served through pairs 114, 116 now passes through new LTS 108. Connectivity to, or the physical presence of, the existing LTS 102 and the WVS 106 are no longer required and may be removed from the wire center as illustrated in FIG. 2. A practitioner of the art will appreciate that the functionality of the WVS 106 could advantageously be integrated into new LTS 108 in some applications while remaining completely within the scope of these teachings.

Figure 3:
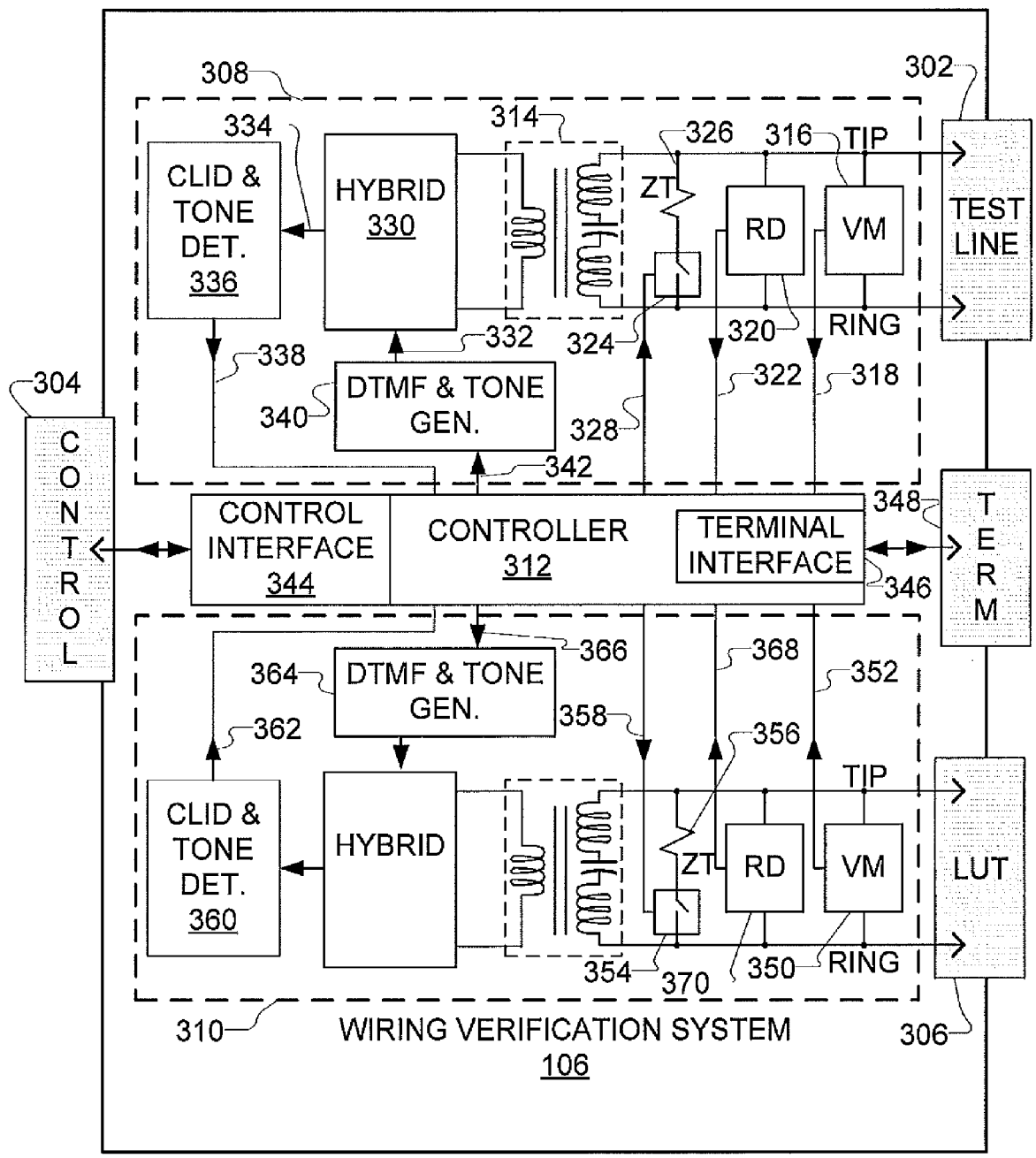
FIG. 3 is a block diagram depicting the functional details of an exemplary embodiment of the wiring verification system of FIG. 1.

FIG. 3 is a block diagram of an exemplary embodiment of the WVS 106. In this exemplary embodiment four connectors are shown as shaded boxes, test-line port 302 which connects to test line 122, Line-Under-Test (LUT) port 304, which connects to LUT 124, control port 306, which connects with control interface 126, and a terminal port 348 connecting to a craft terminal 128, all as shown in FIG. 1. The tip and ring leads in connectors 302, 306 connect to two electrically identical testheads 308 and 310, shown in broken line boxes, which are responsive to controller 312. In function, testheads 308 and 310 simulate subscriber station equipment such as a telephone set or modem. For clarity and brevity only the functional components of testhead 308 will be described. As is standard in the art, all components to the right of coupling transformer 314 are electrically isolated from the control and sensor signals that interface to controller 312 and further designed so as to present minimal AC loading and virtually no nominal DC load. Voltmeter 316 can monitor the voltage across tip and ring and communicate that to controller 312 by means of control signal 318. Controller 312 uses the tip-to-ring voltage obtained from voltmeter 316 to verify: that the polarity is correct (that is, tip and ring are not reversed), that battery voltage, nominally −48V, is present (that is, that the pair is connected) and to ascertain the busy/idle status of the subscriber pair that it is connected to. Ring detector 320 detects the presence of power ringing, which in North America, is nominally 86 Vrms, 20 Hz, superimposed on battery voltage placed on the ring lead. Ring detector 320 makes the presence of power ringing known to controller 312 by means of control signal 322. Ring detector 320 may be optionally designed to present an impedance between tip and ring that simulates a telephone ringer (or a fraction thereof), a practice that is well known in the art. Loop switch 324 causes the "off-hook" state when it closes in response to controller 312 by means of control signal 328 allowing both AC and DC current to flow through termination impedance (ZT) 326. To match the relatively short loops that will be encountered in these testing applications, termination impedance 326 may be designed to have a relatively high DC resistance component to limit power dissipation while providing a somewhat lower voice-band impedance than is common in modem applications. Behind coupling transformer 314 it is not necessary to electrically isolate the signals from local ground reference. Hybrid 330 functions to directionally separate voice-band signals; that is, those signals being sent from the switch from those that may be applied by testhead 308 towards the switch. Circuit arrangements that create hybrid functionality are well known in the art and will not be discussed further Signals transmitted from the switch are passed by hybrid 330 through signal path 334 to tone detector and caller ID decoder block 336 which has been so configured as to detect voice-band tones of interest as well as measure their amplitudes and also to decode the "caller ID" signals from the switch that provide the directory number of the calling party. The information related to detection of tones and the calling party directory number are communicated to controller 312 by means of control signals 338. DTMF and tone generator block 340 feeds signals towards the switch through signal path 332 under direction of controller 312 by means of control signals 342. Controller 312 through control interface 344 and connector 304 communicates control information to new LTS 108 by means control interface 126. Interaction with the WVS 106 by telephone company craft people is through terminal 130, communications means 128, connector 348, terminal interface subsystem 346, and controller 312. As is well known in the art, communications means 128 can be realized by many standard and non-standard methods including, but not limited to: RS-232, USB, Ethernet, and Bluetooth.

Figure 4:
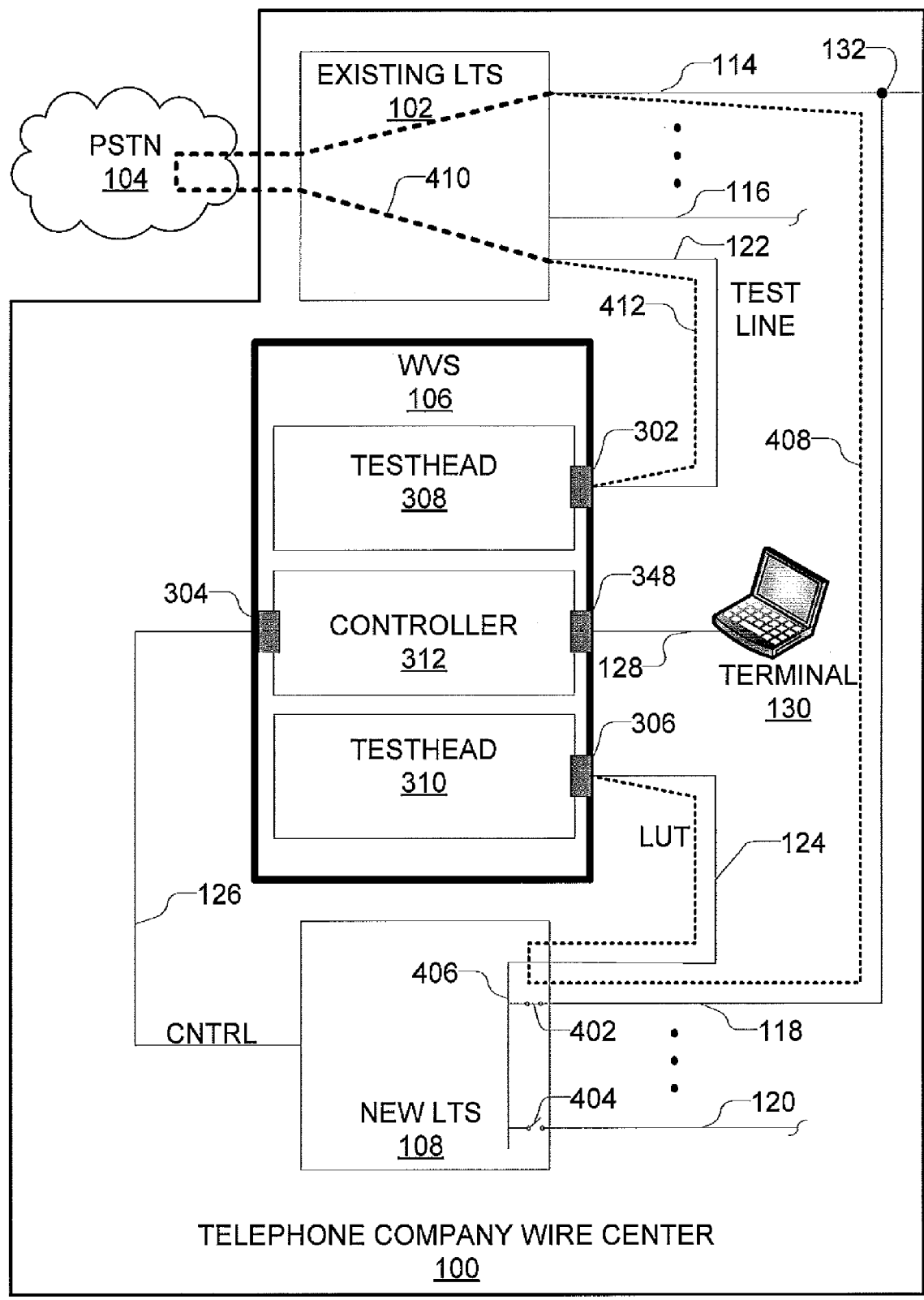
FIG. 4 is a block diagram illustrating the communications paths of an exemplary test call caused by a wiring verification system operational in the environment of FIG. 1.

In accordance with another aspect of this invention, FIG. 4 illustrates an exemplary test call made by the wiring verification system 106 in the operational setting of FIG. 1. Controller 312 by means of control interface 304 and control port 126 on the new LTS 108 causes switch 402 to close resulting in connectivity between the specific wiring connection to be tested, 118 in the present case, and the LUT port 124 of the new LTS 108. Normally open switches 402, 404 illustrate how a plurality of subscriber pairs are individually connected to a single test buss 406 and hence to the LUT port 124. Commonly in the art, this test buss 406 would take the form of a "test-out buss" so called because it provides test access to the "outward" facing portion of the subscriber loop; that is, the loop plant to subscriber premises and hence subscriber terminal equipment such as telephone sets. Furthermore, by means of wye splice 132 and pair 114, the LUT connector 306 on WVS 106 has metallic connectivity with both the active port circuit on existing LTS 102 and the station equipment 110 (not shown). In a sense, the testhead 310 of WVS 106, is another "telephone set" on subscriber pair 114 through the path illustrated as fine dotted line 408. In a manner to be described, test head 310 can go "off-hook", receive dial tone from the PSTN through existing LTS 102, dial the directory number of test line 122 and establish a voice-band connection through PSTN 104 to test line 122. This voice band (not necessarily metallic) connection between the subscriber pair 114 and test line 122 is shown as heavy dotted line 410. Further, test line 122 provides metallic continuity (illustrated by fine dotted line 412) to testhead 308 by means of connector 302. Nominally, in the scenario presented here, testhead 308 would receive a power ringing burst followed by caller ID coded information and an "off-hook" by testhead 308 would result in an end-to-end voice band path between testheads 308, 310 by means of paths 408, 410, and 412.

Figure 5:
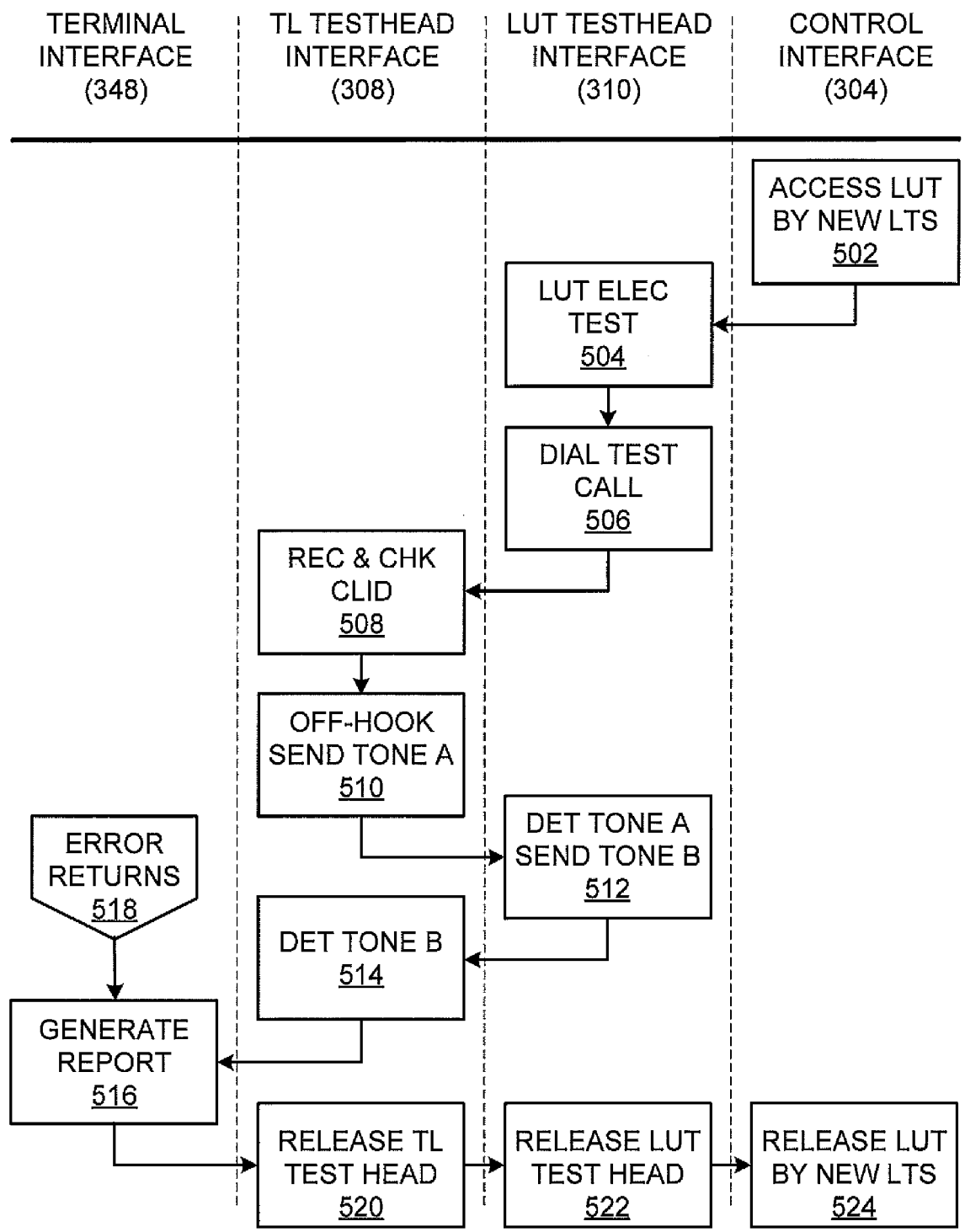
FIG. 5 is a flow chart illustrating, at a high level, the control functions of a wiring verification system to establish the exemplary test call of FIG. 4 and test the associated subscriber wiring.

FIG. 5 illustrates the preferred methodology of the test call considered in FIG. 4, specifically in this figure the actions of controller 312 to accomplish this testing are considered in the context of the systems and subsystems with which it is interacting. Accordingly, as an aid to the reader, the control functional blocks are separated in the figure in columns; these columns from the right: communications between the WVS 106 and New LTS 108 through control interface 304, interactions between controller 312 and LUT testhead 310, interactions between controller 312 and test line testhead 308 and leftmost communications between controller 312 and craft terminal 130 by means of interface 348.

Processing begins in block 502 wherein controller 312 communicates to the new LTS which line termination is requested and then proceeds to block 504 wherein an electrical test of the LUT 124 is performed by LUT testhead 310. Subsequently in block 506, controller 312 causes LUT testhead 310 to place a test call to test line 122 whereupon in block 508 controller 312 receives and decodes the caller ID information received by test line testhead 308 resulting from said test call. Continuing with block 510, controller 312 causes test line test head 308 to go off-hook on test line 122 nominally resulting in a voice band channel being present between testheads 308 and 310 whereupon in blocks 512 and 524 test tones are exchanged between these testheads under the direction of controller 312. Finally in block 516 a report is generated by controller 312 and sent to craft terminal 130 by means of terminal interface 348. As is standard in the art, "error returns" are incorporated into these processing blocks to provide for problems discovered by the testing or resulting from processing or system errors. Said error returns are directed by controller 312 towards the report generation block 516 for incorporation into the report by means of common error return block 518. Subsequent figures FIG. 6, FIG. 7, and FIG. 8 consider the details of the processing blocks described in FIG. 5. For clarity and without loss of generality, the discussion of processing related to FIGS. 6, 7, and 8 will assume that the line under test is 114, the first of the plurality of subscriber lines designated as 114, 116; hence, the reader may refer to the test call represented by dotted lines 408, 410, 412 as illustrated in FIG. 4 for clarification. The reader will appreciate that the remainder of the plurality of subscriber lines 114, 116 can be subsequently tested in an analogous manner.

Figure 6:
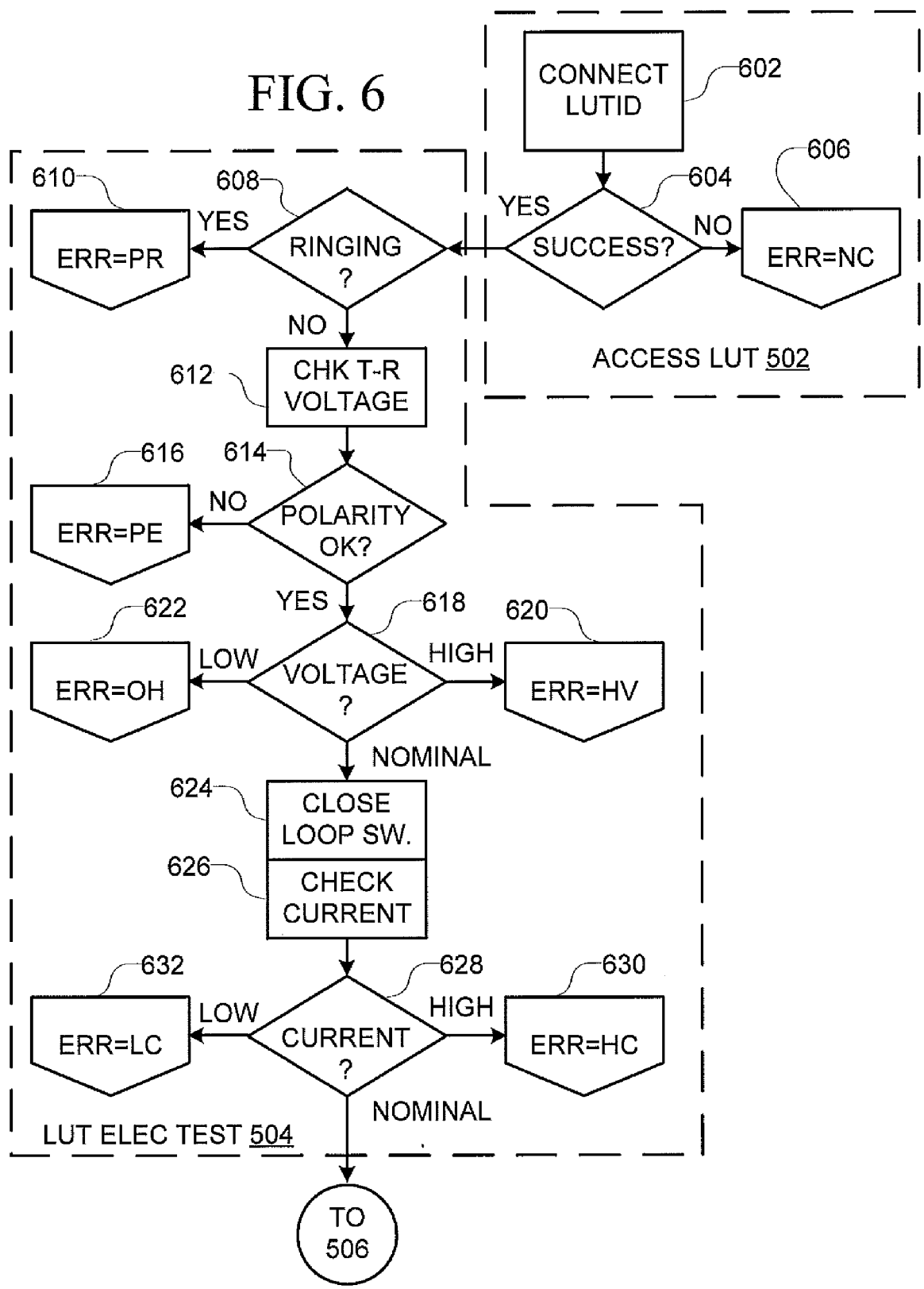
FIG. 6 is a flow chart providing additional detail related to FIG. 5 including certain electrical tests on line under test and of the origination of an exemplary test call through said line under test by the wiring verification system.

The details of block 502 are illustrated In FIG. 6. Beginning in processing block 602, controller 312 communicates to the new LTS 108 via control interface 344, control connector 304 and communications means 126 that the subscriber line identified by "LUTID" should be connected to LUT 124 and receives confirmation that this request has been successful or not. In logical test block 604 this response is tested and, if successful, control passes onto block 504 and specifically detail block 608. If the connection did not succeed control is passed to error return block 606 with an error code "ERR" of "NC", that is "No Connection". The LUT electrical tests of block 504 commence beginning in block 608 wherein controller 312 samples input 368 from ringing detector 370 to ascertain whether the subscriber line has power ringing applied to it, likely indicating a call in progress. If so, control is transferred to error return 610 with an error code of "PR" for "Power Ringing". If power ringing is not present, control is passed to block 612 wherein controller 312 causes voltmeter 350 to report by means of signal interface 352 the tip-to-ring voltage. In logical test block 614 the polarity of the voltage is tested to insure that tip is more positive than ring and hence that wye splice 132 (in the present context) has been correctly terminated tip to tip and ring to ring. Should the polarity be incorrect, control is passed to error return block 616 with error code "PE" for "Polarity Error". Upon successful completion of the polarity test or if the amplitude of the voltage is too small to be a reliable test (for example below 5V) control is passed to block 618. In logical test block 618, the absolute value of the tip-to-ring voltage is tested; should the voltage be low, but still measureable, for example between 5V and 42V, the probable cause is that the subscriber is off-hook and control is transferred to error return block 622 with error code "OH" meaning that the subscriber is likely "Off Hook". If the voltage is instantaneously high or has a large AC component a wiring error or the application of power ringing (subsequent to the test in block 608) may be the cause; in this exemplary embodiment control is passed to error return block 620 to defer testing, for the present, on this subscriber line rather than do additional analysis, wherein the error code "HV" for "High Voltage" is used. Should the tip-to-ring voltage be found to be DC only and nominal central office battery voltage, say 44-58V, control is passed to block 624 wherein controller 312 causes the loop switch 354 to close by means of control signal 358. Controller 312 then queries voltmeter 350 again to measure the "off-hook" voltage in block 626 and by knowing the size of termination impedance "ZT" 354 can estimate the DC "loop" current flowing in the subscriber line. Logical test block 628 tests the estimated current against expected values. A low value, for example below about 15 mA causes transfer to error return block 632 with error code "LC" for "Low Current" which could result from the pair being shorted together or not wired at all (that is, open). If the current is higher than expected, for example more than about 100 mA, results in transfer to error return block 630 with error code "HC" for "High Current", a probable cause of high current would be a wiring error. If the estimated current fails within the expected range control transfers out block 504 onto block 506 in FIG. 7. A skilled practitioner of the art will appreciate that the voltage ranges used in test blocks 614, 618 and the current ranges used in test block 628 may have to be customized for specific installation and certainly the current ranges suggested herein are a strong function of the choice of DC resistance component of terminating impedance ZT 356.

Figure 7:
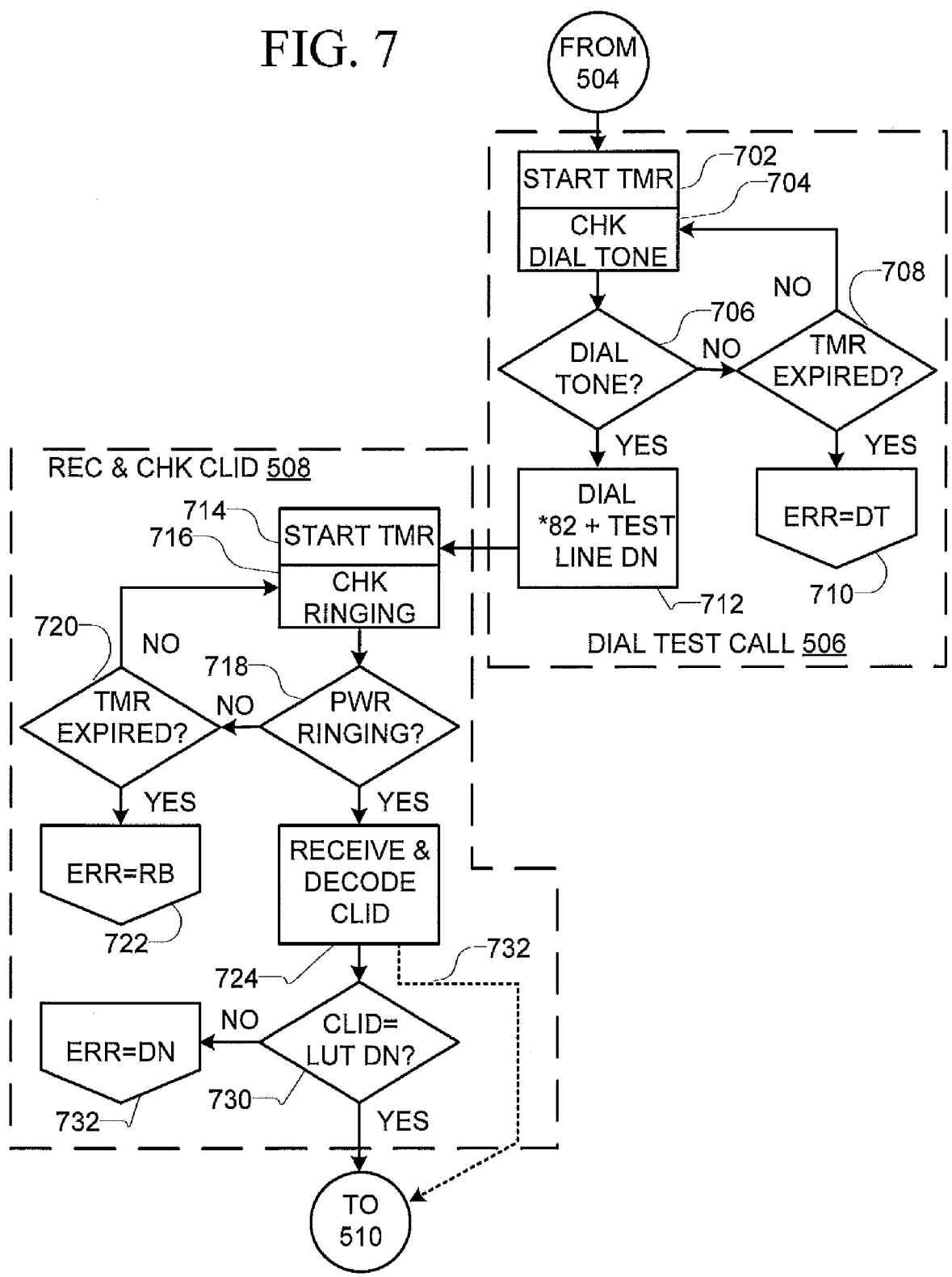
FIG. 7 is a flow chart illustrating the ensuing steps related to the establishment of the exemplary test call begun in FIG. 6 from the line under test to the test line and confirming the directory number of said line under test as caused by the controller within the wiring verification system.

FIG. 7 shows the details of block 506 to which processing would nominally transfer from block 504 after completion of the LUT electrical tests. Beginning processing with block 702 which starts a timer in anticipation of some reasonable delay before the detection of dial tone, the presence of which is checked for in block 704. Dial tone detection results from CLID and tone detector 360 communicating through control signal means 362 to controller 312. In logical test block 706 if dial tone is not so detected, control is passed to logical test block 708 which checks to see if the dial tone delay timer started in block 702 has expired, if it has not, the dial tone detection process of blocks 704 and 706 are repeated. If the allotted time for dial tone detection has expired, control transfers to error return block 710 with error code "DT" for "Dial Tone". A cause for failure to detect dial tone could be that the subscribers service has been terminated but the pair not disconnected from the existing LTS. When dial tone is detected in logical test block 706 control is passed to block 712 wherein controller 312 causes DTMF and tone generator 364 to send DTMF digits corresponding to the CLID unblocking code, commonly *82, followed by the telephone number for the test line 122 in accordance with the dial plan used by the local carrier. The dialing method is assumed to be DTMF in the instant exemplary embodiment for simplicity, so-called "rotary dialing", wherein dialed digits are signaled to the switch by means of momentary loop current interruptions, may be substituted in this specification. Processing now continues on with block 508 wherein controller 312 is now interacting with test-line testhead 308 in anticipation of receiving the test call placed in block 506. Beginning in block 714, a timer is initialized. In block 716, controller 312 samples input 322 from ring detector 320 for the presence of power ringing voltage on the test line pair 122 through connector 302. If power ringing is not detected as tested in logical test block 718 control passes onto logical test block 720 wherein the timer is tested for expiration, if expiration has not occurred, the loop consisting of 716, 718 and 720 continues to operate until power ringing detection or timer expiration. Timer expiration causes transfer to error return block 722 with error code "RB" for "Ringing Bad" which may indicate that the test line 122 was incorrectly wired or the telephone number for it is incorrect. Detection of the first burst of power ringing (typically two seconds in length in North America) causes transfer of processing to block 724 wherein controller 312 receives the decoded "caller ID" (CLID) from CLID and tone detector 336 by means of control input 338. One skilled in the art will appreciate that the CLID is encoded in the non-ringing period between the first and second power ringing bursts and that failure to detect any CLID will not normally cause CLID detection and decoding means 336 to malfunction but will not indicate a valid caller ID. In logical test block 730 the CLID that was received is compared to the directory number believed to be associated with the line under test (if known) and if there is a failure to correspond control is transferred to error return block 732 with error "DN" for "Directory Number". In an alternative embodiment, this test step can be ignored and the directory number received from the CLID can be associated with the line under test in the manner of an audit, this option is show in dotted line 732; in this case, WVS 106 can be said to "discover" the directory number associated with the subscriber pair 114 onto which splice 132 has been made.

Figure 8:
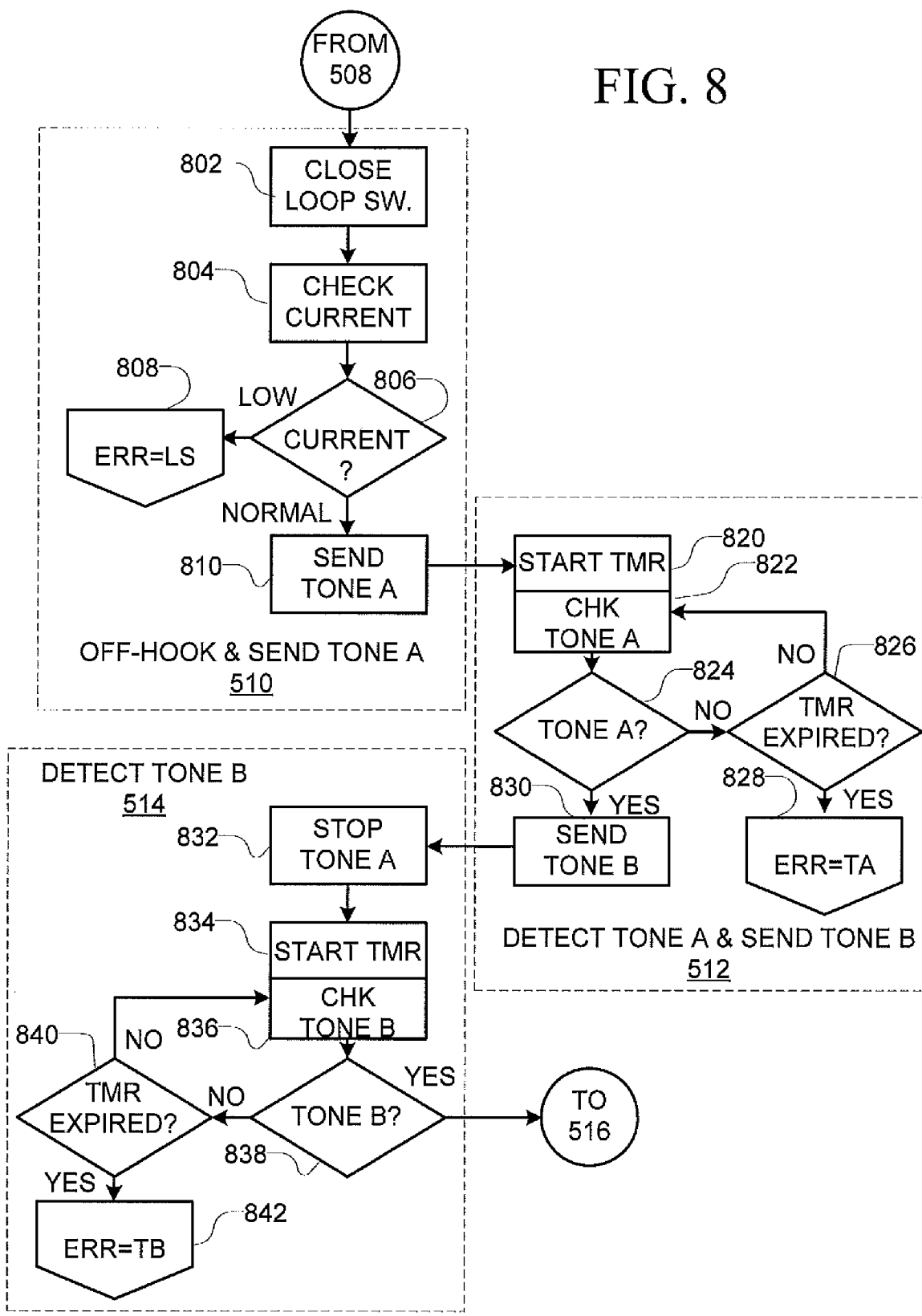
FIG. 8 is a flow chart illustrating some optional testing insuring that a voice band connection exists between the line under test and the test line caused by the controller of the wiring verification system, which may be a part of an exemplary test call illustrated at a high level in FIG. 5.

FIG. 8 illustrates the remaining tests, which go somewhat beyond simple wiring verification, and insure the functionality of the of the test environment by insuring voice band connectivity in both directions, these tests may be omitted in an alternative embodiment. Continuing the interaction between controller 312 and test line testhead 308 in block 510, within block 802 controller 312 causes loop switch 324 to close by means of control signal 328 which places terminating impedance (ZT) 326 across tip and ring of test line 122 through connector 302. In block 804 controller 312 estimates the loop current by sampling the tip-to-ring voltage by means of input 318 from voltmeter 316 (in a manner analogous to the processing of block 626) and in logical test block 806 a very low or absent DC loop current causes transfer of control to error return block 808 with error code "LS" for "Loop Switch" a failure of which would be a likely causation of low loop current. Assuming that the loop current is in the normal range, control proceeds to block 810 wherein controller 312 causes DTMF and tone generator 340 by means of control 342 to emit a specific tone "tone A" towards the network. Control thereupon transfers to block 512 with controller 312 now interacting with LUT testhead 310 and specifically to block 820 starting a timer, then to block 822 wherein controller 312 samples CLID and tone detector 360 via signal input 362 and then through blocks 824 and 826, which constitute a timer delimited tone detection loop in the same manner as the dial tone detection logic of block 506 and will not be discussed further. Should the timer expire, control will pass to error return block 828 with an error code of "TA" for "Tone A". With successful detection of tone A control is transferred from logical test block 830 wherein controller 312 causes DTMF and tone generator 364 through control means 366 to emit a specific tone "Tone B" towards the network.

Controller 312 now returns to interaction with test line testhead 308 shown in logical block 514 in anticipation of receiving the tone emitted in block 512. Emitting tone A is no longer required and may potentially interfere with the detection of tone B hence in block 832 controller 312 causes DTMF and tone generator 340 to cease transmitting any tones by means of control line 342. In the same manner as was done in the logic of block 512, a timer delimited tone test loop comprising blocks 834, 836, 838, and 840 attempts to confirm the presence of tone B. Should the timer expire without detection of tone B control is passed to error return 842 with error code of "TB" for "Tone B".

As depicted in FIG. 5 all processing from the logic associated with the wiring test functionality will ultimately transfer operational control to block 516 whether directly from block 514 as a consequence of encountering no errors or by means of error returns transferring control to block 518. Within the processing of block 516, controller 312 prepares a summary of the results of testing the particular line under test, represented by "LUTID" in this exemplary embodiment, which is in turn transmitted to the craft terminal 130 through terminal interface 346, connector 348 and communications means 128. The processing of such a report is standard in the art and noncontributory to the understanding of this invention and will not be considered further. The content of the report, however, helps the reader understand possible corrective actions and is the subject of FIG. 9 and FIG. 10.

Again as depicted in FIG. 5, following the generation of the report in block 516 control is passed to block 520 wherein controller 312 releases the test-line testhead 308 by causing the loop switch 324 to open by control signal 328 and insures that no tones are emitted by DTMF and tone generator 340 by means of control signal 342. Control is passed to block 522 wherein controller 312 similarly releases LUT testhead 310 by causing the loop switch 354 to open by control signal 358 and insures that no tones are emitted by DTMF and tone generator 364 by means control signal 366. Control is then passed to block 524 wherein controller 312 communicates through control interface 344, connector 304, and communications means 126 to new LTS 108 causing it to release any metallic contact with any of the lines it serves, thus releasing it to prepare for another test.

While the wiring verification system described in this specification would be useful to manually test individual subscriber lines on command from a craft terminal, testing a multiplicity of lines in an automated fashion is advantageous in many applications. Towards this end, it is useful to resolve as many of the error conditions considered in the previous exemplary embodiment as possible into whether they do, or do not, constitute wiring errors that require the attention of a craftsperson. FIG. 9 contains a table wherein the error exits that may occur as a result of the testing process of FIG. 5 are summarized. The table of FIG. 9 is comprised of five columns the first (leftmost) contains the error codes as used in this specification, the second column the description of the error code, the third column a probable cause for the error, the fourth column a suggested action for the craftsperson or automated test process to take as a result of this error condition and finally in the last (rightmost) column a judgment on whether a wiring error has been detected with a high probability. Consider in FIG. 9 row 902 containing the error code "PE" for "Polarity Error" which, as discussed in the context of FIG. 6, is associated with the tip and ring conductors being cross wired, and the appropriate action entered in the "Action" column is to physically check the wiring and as reported in the last column a wiring error is highly likely. In contrast, in row 904 containing the error code "OH" for "Off Hook" which, as discussed in the context of FIG. 6, is probably related to the subscriber line being in use (i.e., "off hook"), hence an appropriate action is to "retry" and as indicated in the last column ("INDET") a wiring error cannot be confirmed (i.e., it is "Indeterminate"). In row 906, the error code "HV" indicates that a high voltage has been detected on the subscriber pair and the recommended action is to check the wiring while mindful that hazardous voltages may be present and in the last column this condition almost certainly constitutes a wiring error. In summary, those test results that are associated with a high likelihood of a wiring error do not require additional analysis while those that result in a recommended action of "retry" should be further tested. In this manner the number of subscriber lines that remain in the indeterminate state should be minimized.

FIG. 10 depicts a specimen report that could result from automating the process of testing a multiplicity of subscriber lines. Using the techniques described in conjunction with FIG. 9 the tested lines are categorized as either correctly wired or not and the indeterminate cases resolved. The exemplary embodiment of FIG. 10 contains only the most rudimentary information, to wit: the "LUTID", the "Assumed DN", the "Received DN", "Error Code" (if any) and the detection of a "Wiring Error". One skilled in the art could add other details which may be advantageous in some applications such as the measured voltages and currents. The three most common cabling errors encountered in these settings are: reversal of tip and ring, failure to cross connect to the correct pair, and failure to wire the pair at all. Examples of these three wiring errors are illustrated in the table of FIG. 10. In row 1002 (LUTID=3) a "PE" error is detected that indicates a likely reversal of tip and ring in this exemplary embodiment, this results in an error exit without continuing with the test call and receiving the caller ID information thus leaving the "Received DN" entry blank; this is an implementation choice only and not a limitation of the instant method and apparatus. Row 1004 (LUTID=6) illustrates the a wiring error resulting from connecting the pair from new LTS 108 to other than the designated pair on the existing LTS 102 in that the "assumed DN" and the "received DN" are not identical. An alternative to rewiring the subscriber pair to the correct subscriber pair is to change the designation in the new LDS to the pair. In the present example, in row 1004, the port on new LTS 108 that is LUTID=6 would thus be assigned the directory number 303-555-2445. Lastly in row 1006 the subscriber pair is not functionally connected to the existing LTS 102 and no action other than rewiring is feasible.

Returning to FIG. 4, a practitioner conversant in the art will appreciate from reading these specifications that the network connection comprising dotted lines 408, 410, and 412, between test line 122 and line under test 124, could be established using the method and apparatus disclosed herein in the opposite direction. That is, by virtue of the symmetry of test-line testhead 308 and line-under-test testhead 310 the test call of FIG. 5 could have been originated on test line 122 and terminated on line under test 124 with materially the same testing capabilities. However a potential drawback to this approach is that power ringing would appear on the subscriber line from existing LTS 102 with the attendant possibility of disturbing the subscriber with an incoming test call.

It is to be understood that the above-described embodiments of this invention are merely illustrative of the present invention and that many variations of the above-described embodiments can be devised by one skilled in the art without departing from the scope of the invention. It is therefore intended that such variations be included within the scope of the following claims and their equivalents.

I claim:

1. A wiring verification system for testing the correct pairing of a plurality of subscriber lines between an existing line termination system and a replacement line termination system connected to the public switched telephone network, said wiring verification system comprising:
   a controller;
   a first test head responsive to said controller interacting with a test line which connects to the telephone network for the purpose of terminating a test call;
   a control interface responsive to said controller that communicates to a replacement line termination system for the purpose of establishing electrical connectivity between one of the subscriber lines and a line under test line; and
   a second test head responsive to said controller interacting with the line under test line for the purpose of originating a test call on the line under test line, via the existing line termination system, through the public switched telephone network terminating towards the test line;
   wherein said test heads and controller monitor parameters of the test call to determine whether the subscriber line under test in the replacement line termination system is associated with a same directory number as a corresponding subscriber line in the existing line termination system.

2. The wiring verification system of claim 1 further comprising automated means for testing a plurality of subscriber lines and reporting the results.

3. The wiring verification system of claim 1 further comprising automated means for resolving the causation of wiring errors and recommending corrective action.

4. The wiring verification system of claim 1 wherein the first test head further comprises a caller ID decoder for identifying the directory number of the subscriber line under test.

5. The wiring verification system of claim 1 wherein the first test head further comprises a voltmeter measuring the voltages on the line under test to verify correct splicing of tip to tip and ring to ring.

6. The wiring verification system of claim 1 wherein the first test head further comprises a voltmeter measuring the voltages on the line under test to detect the presence of hazardous conditions.

7. The wiring verification system of claim 1 wherein the first test head further comprises a voltmeter measuring the voltages on the line under test to determine the busy/idle status of that subscriber line.

8. The wiring verification system of claim 1 wherein the test heads further comprise means for transmitting and detecting test tones over the test call.

9. A method for verifying the correct pairing of a plurality of telephone subscriber lines between an existing line termination system and a replacement line termination system in a wire center having a test line connecting to the telephone network, said method performed by a wire verification system with a controller and at least one testhead, said method comprising:
   interacting with the test line for the purpose of terminating a test call;
   communicating with the replacement line termination system to establish electrical connectivity between a selected one of the plurality of subscriber lines and a line under test line;
   interacting with the line under test line to originate a test call on the line under test line through the existing line termination system and the telephone network terminating towards the test line; and
   monitoring the test call received on the test line to determine whether the subscriber line under test in the replacement line termination system is associated with a same directory number as a corresponding subscriber line in the existing line termination system.

10. The method of claim 9 further comprising automatically testing a plurality of subscriber lines and reporting the results.

11. The method of claim 9 further comprising resolving the causation of wiring errors and recommending corrective action.

12. The method of claim 9 further comprising decoding the caller ID data of test call received on the test line to identify the directory number of the subscriber line under test.

13. The method of claim 9 further comprising measuring the voltages on the line under test to verify correct splicing of tip to tip and ring to ring.

14. The method of claim 9 further comprising measuring the voltages on the line under test to detect the presence of hazardous conditions.

15. The method of claim 9 wherein the first test head further comprises measuring the voltages on the line under test to determine the busy/idle status of that subscriber line.

16. The method claim 9 further comprising transmitting and detecting test tones over the test call.

17. A method for verifying the correct pairing of a plurality of telephone subscriber lines between an existing line termination system and a replacement line termination system in a wire center having a test line connecting to the telephone network, said method performed by a wire verification system with a controller and at least one testhead, said method comprising for each telephone subscriber line:
   interacting with the test line for the purpose of terminating a test call;
   communicating with the replacement line termination system to establish electrical connectivity between a selected one of the plurality of subscriber lines and a line under test line;
   interacting with the line under test line to originate a test call on the line under test line through the existing line termination system and the telephone network terminating towards the test line;
   monitoring whether the test call is received on the test line;
   measuring the voltages of the test call on the line under test;
   decoding the caller ID data for the test call received on the test line to determine whether the subscriber line under test in the replacement line termination system is associated with a same directory number as a corresponding subscriber line in the existing line termination system;
   transmitting and detecting test tones over the test call; and
   generating an error report indicating any error in the preceding steps for the subscriber line under test.

* * * * *